(12) United States Patent
Boneh et al.

(10) Patent No.: US 7,970,141 B2
(45) Date of Patent: Jun. 28, 2011

(54) METHOD AND APPARATUS FOR TRACING THE SOURCE OF DECRYPTION KEYS USED BY A DECODER

(75) Inventors: Dan Boneh, Palo Alto, CA (US); Amit Sahai, Los Angeles, CA (US); Brent Waters, Woodside, CA (US)

(73) Assignees: The Regents of the University of California, Oakland, CA (US); SRI International, Menlo Park, CA (US); The Board of Trustees of the Leland Stanford Junior University, Stanford, CA (US)

( * ) Notice: Subject to any disclaimer, the term of this patent is extended or adjusted under 35 U.S.C. 154(b) by 936 days.

(21) Appl. No.: 11/855,008

(22) Filed: Sep. 13, 2007

(65) Prior Publication Data

US 2008/0075287 A1 Mar. 27, 2008

Related U.S. Application Data

(60) Provisional application No. 60/825,536, filed on Sep. 13, 2006.

(51) Int. Cl.
*H04L 9/00* (2006.01)

(52) U.S. Cl. .......... 380/277; 380/278; 380/286; 380/28; 713/155; 713/158

(58) Field of Classification Search .......... 380/277–278
See application file for complete search history.

(56) References Cited

U.S. PATENT DOCUMENTS

| | | | |
|---|---|---|---|
| 6,760,445 B1 * | 7/2004 | Schwenk et al. | 380/278 |
| 6,839,436 B1 * | 1/2005 | Garay et al. | 380/278 |
| 7,568,094 B2 * | 7/2009 | Matsushita | 713/155 |
| 7,697,680 B2 * | 4/2010 | Arditti Modiano et al. | 380/28 |

OTHER PUBLICATIONS

Boneh et al., Cousion Resistant Broadcast Encryption With Short Ciphertexts and Private Keys, Advances in CRYPTO 2005, Springer-Verlag, 2005.*
Boneh et al., An Efficient Public Key Traitor Tracing Scheme, Advances in CRYPTO'99, Springer-Verlag, 1999.*
Boneh et al., Fully Collusion Resistant Traitor Tracing With Short Ciphertexts and Private Keys, Advances in Cryptology-EUROCRYPT 2006, Springer-Verlag 2006.*
Boneh et al., A Fully Collusion Resistant Broadcast, Trace, and Revoke System, Proceedings of the 13th ACM Conference on Computer & Communications Security, Aug. 2006.*
Matsushita et al., A public-key black-box Traitor Tracing Scheme with Sublinear Ciphertext Size against Self-Defensive Pirates, Advances in Cryptology-ASIACRYPT 2004, Springer-Verlag, 2004.*

* cited by examiner

*Primary Examiner* — Nabil M El Hady (57) ABSTRACT

The present invention relates to a method for traitor tracing. One embodiment of a method for determining at least one traced private key used by a decoder to decrypt an encrypted message includes defining an input ciphertext, the input ciphertext being associated with a tracing private key and having a sublinear size, calling the decoder on the input ciphertext, and associating the tracing private key with a set of traced private keys if the decoder is able to correctly decrypt the encrypted message in accordance with the input ciphertext, the set of traced private keys including at least one private key.

19 Claims, 3 Drawing Sheets

METHOD AND APPARATUS FOR TRACING THE SOURCE OF DECRYPTION KEYS USED BY A DECODER

CROSS REFERENCE TO RELATED APPLICATIONS

This application claims the benefit of U.S. Provisional Patent Application Ser. No. 60/825,536, filed Sep. 13, 2006, which is herein incorporated by reference in its entirety.

REFERENCE TO GOVERNMENT FUNDING

This invention was made with Government support under contracts numbers CCR-0205733, CNS-0524111, CNS-0331640, and CNS-0456717, awarded by the National Science Foundation. The Government has certain rights in this invention.

FIELD OF THE INVENTION

The present invention relates generally to cryptography, and relates more particularly to collusion resistant traitor tracing.

BACKGROUND OF THE DISCLOSURE

Traitor tracing systems help content distributors to identify pirates. For example, consider an encrypted satellite radio broadcast that should only be played on certified decoders (e.g., radio receivers). The broadcast is encrypted using a public broadcasting key, BK. Any certified decoder can decrypt the broadcast using an embedded private key, $K_i$. However, there is also the risk that a pirate can compromise a certified decoder and extract the private key, $K_i$. The pirate could then build a pirate decoder that will extract the cleartext content from the encrypted broadcast using the extracted private key, $K_i$. The pirate could even make the pirate decoder widely available so that anyone can extract the cleartext content for themselves.

Thus, there is a need in the art for a method and apparatus for traitor tracing.

SUMMARY OF THE INVENTION

The present invention relates to a method for traitor tracing. One embodiment of a method for determining at least one traced private key used by a decoder to decrypt an encrypted message includes defining an input ciphertext, the input ciphertext being associated with a tracing private key and having a sublinear size, calling the decoder on the input ciphertext, and associating the tracing private key with a set of traced private keys if the decoder is able to correctly decrypt the encrypted message in accordance with the input ciphertext, the set of traced private keys including at least one private key.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention relates to a method and apparatus for traitor tracing. For the purposes of the invention, the term "traitor tracing" is understood to refer to the ability of a content distributor to, once a pirate decoder has been obtained, run an algorithm that interacts with the pirate decoder and outputs an index, i, of at least one of the secret keys, $K_i$, used to create the pirate decoder. Some embodiments of the present invention treat a pirate decoder as a black box oracle and perform traitor tracing based on a primitive referred to herein as "private linear broadcast encryption" (PLBE). Other embodiments of the present invention perform traitor tracing based on a primitive referred to herein as "augmented broadcast encryption" (ABE). The methods described herein are capable of tracing traitors regardless of the number of traitors (e.g., regardless of the number of compromised private keys).

A PLBE in accordance with the present invention comprises four algorithms: $\text{Setup}_{LBE}$, $\text{Encrypt}_{LBE}$, $\text{TrEncrypt}_{LBE}$, and $\text{Decrypt}_{LBE}$. The $\text{Setup}_{LBE}(N, \lambda)$ algorithm takes the number, N, of users in a system and a security parameter (e.g., key length), $\lambda$, as input. In one embodiment, the $\text{Setup}_{LBE}(N, \lambda)$ algorithm runs in polynomial time in the security parameter, $\lambda$, and outputs a public encryption key, PK, a secret tracing key, TK, and N private keys, $K_1, \ldots, K_N$, where the private key $K_u$ is given to the user u.

The $\text{Encrypt}_{LBE}(PK, M)$ algorithm takes a public encryption key, PK, and a message, M, as input and outputs a ciphertext, C. Thus, the $\text{Encrypt}_{LBE}(PK, M)$ algorithm is used to encrypt the message, M, to all N users of the system.

The $\text{TrEncrypt}_{LBE}(TK, i, M)$ algorithm takes a secret tracing key, TK, a message, M, and an integer, i, that satisfies $1 \leq i \leq N+1$ as input and outputs the ciphertext, C. Thus, the $\text{TrEncrypt}_{LBE}(TK, i, M)$ algorithm encrypts a message (e.g., message M) to a set of users (e.g., users $\{i, \ldots, N\}$). The $\text{TrEncrypt}_{LBE}(TK, i, M)$ algorithm is used primarily for traitor tracing. In one embodiment, the $\text{TrEncrypt}_{LBE}(TK, i, M)$ algorithm outputs a distribution of ciphertexts that is indistinguishable from the distribution generated by the $\text{Encrypt}_{LBE}(PK, M)$ algorithm.

The $\text{Decrypt}_{LBE}(j, K_j, C, PK)$ algorithm takes the private key, $K_j$, for user j, the ciphertext, C, and the public encryption key, PK, and outputs the message, M or $\bot$.

The PLBE system satisfies the following correctness property: for all i, $j \in \{1, \ldots, N+1\}$, where $j \leq N$, and for all messages, M:

Let $(PK, TK, (K_1, \ldots, K_N)) \underset{R}{\leftarrow} \text{Setup}_{LBE}(N, \lambda)$ and let $C \underset{R}{\leftarrow} \text{TrEncrypt}_{LBE}(TK, i, M)$.

If $j \geq i$, then $\text{Decrypt}_{LBE}(j, K_j, C, PK) = M$.

A traitor tracing system may be defined in a manner substantially similar to the PLBE system. That is, one embodiment of traitor tracing system comprises four algorithms: Setup, Encrypt, Decrypt, and Trace. Using the notation of the PLBE system described above, the Setup algorithm takes a number, N, of users in a system and a security parameter, $\lambda$, as input. In one embodiment, the Setup algorithm runs in polynomial time in the security parameter, $\lambda$, and outputs a public broadcasting key, BK, a secret tracing key, TK, and N private keys, $K_1, \ldots, K_N$, where the private key $K_u$ is given to the user u.

The Encrypt algorithm takes a public broadcasting key, BK, and a message, M, as input and outputs a ciphertext, C. Thus, the Encrypt algorithm is used to encrypt the message, M, to all N users of the system.

The Decrypt algorithm decrypts a ciphertext, C, using the private key, $K_j$, for user j, and outputs a message, M or $\bot$.

The Trace algorithm is an oracle algorithm that takes a secret tracing key, TK, and a parameter, $\in$, and runs in polynomial time in the security parameter, $\lambda$, and $1/\in$. Only values of the parameter, $\in$, that are polynomially related to the security parameter, $\lambda$, are considered valid inputs to the Trace algorithm. The trace algorithm queries a pirate decoder, D, as a black box oracle, and outputs a set, S, which is a subset of $\{1, 2, \ldots, N\}$.

The traitor tracing system satisfies the following correctness property: for all $j \in \{1, \ldots, N\}$, and for all messages, M:

Let (BK, TK, $(K_1, \ldots, K_N)$) $\underset{R}{\leftarrow}$ Setup (N, $\lambda$)

and let C $\underset{R}{\leftarrow}$ TrEncrypt (BK, M).

then Decrypt (j, $K_j$, C, BK)=M.

Figure 1:
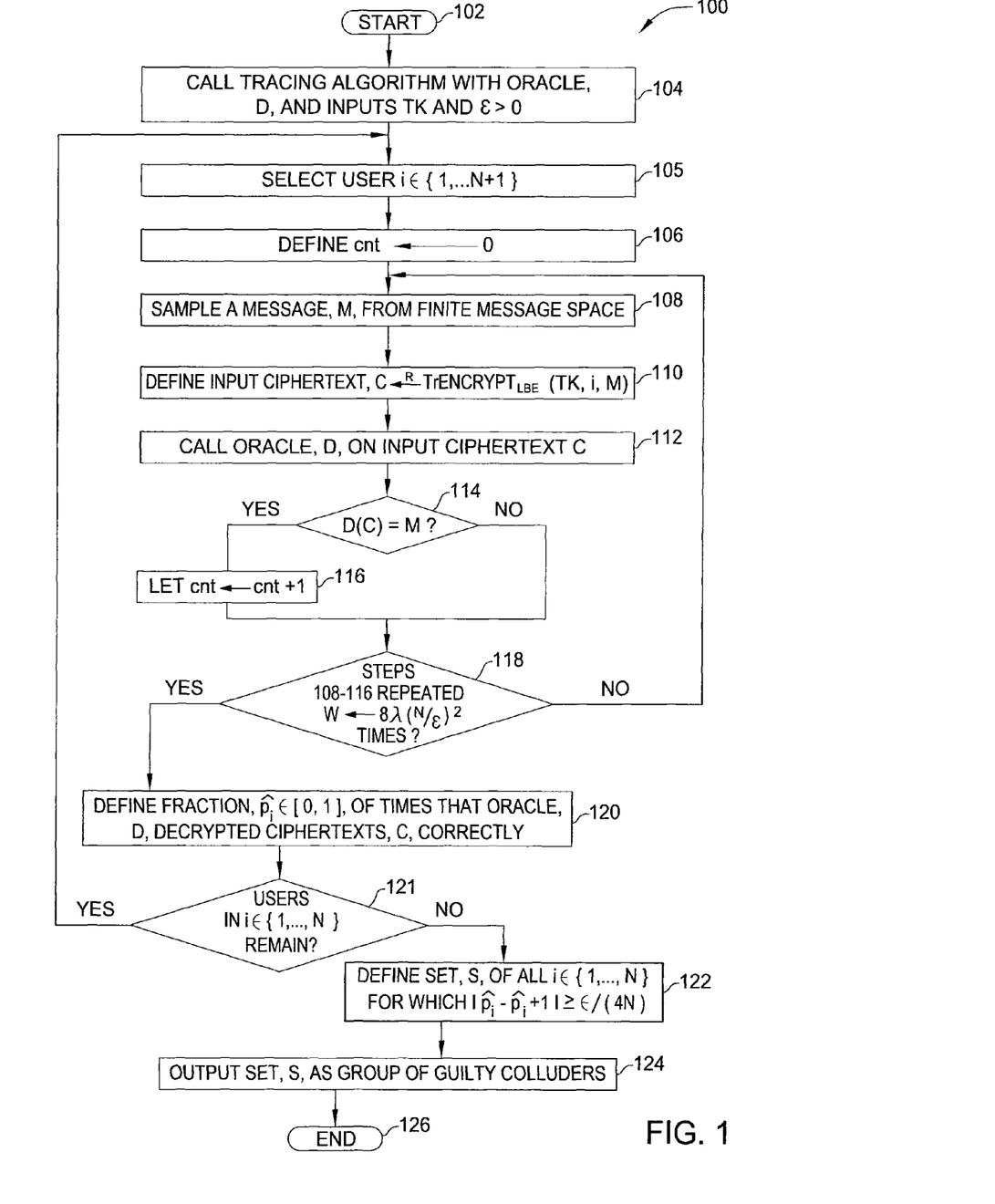
FIG. 1 is a flow diagram illustrating one embodiment of a method 100 for tracing traitors, according to the present invention.

FIG. 1 is a flow diagram illustrating one embodiment of a method 100 for tracing traitors, according to the present invention. The method 100 is derived from the PLBE system described above and views a pirate decoder, D, as a probabilistic circuit that takes as input a ciphertext, C, and outputs some message M or $\bot$. The method 100 defines a secure PLBE system, $\in$=(Setup$_{LBE}$, Encrypt$_{LBE}$, TrEncrypt$_{LBE}$, Decrypt$_{LBE}$). The method 100 assumes that a Setup algorithm in accordance with the PLBE system described above (i.e., Setup$_{LBE}$) has been run and has output a public encryption key, PK, a secret tracing key, TK, and N private keys, $K_1, \ldots, K_N$, for N users. In addition, the method 100 assumes that Encrypt and Decrypt algorithms in accordance with the PLBE system described above (i.e., Encrypt$_{LBE}$ and Decrypt$_{LBE}$) have been run. The following steps of the method 100 thus define a Trace$^D$(TK, $\in$) algorithm.

The method 100 is initialized at step 102 and proceeds to step 104, where the method 100 calls the tracing algorithm with oracle, D, and inputs comprising: the secret tracing key, TK, and the parameter $\in$>0.

In step 105, the method 100 selects a user i, where i $\in$ $\{1, \ldots N+1\}$.

In step 106, the method 100 defines a counter that is initialized to zero (i.e., cnt$\leftarrow$0).

In step 108, the method 100 samples a message, M, from a finite message space. In one embodiment, the message is sampled at random from the message space. In another embodiment, the method 100 samples a message that is "similar" to a message of interest (e.g., in the case of a video broadcast, the message 100 might look for an image that resembles an image of interest).

In step 110, the method 100 defines an input ciphertext as

C $\underset{R}{\leftarrow}$ TrEncrypt$_{LBE}$(TK,i,M).

In step 112, the method 100 calls the oracle, D, on the input ciphertext, C. The method 100 then proceeds to step 114 and determines whether the oracle, D, decrypted the input ciphertext correctly (i.e., whether D(C)=M).

If the method 100 concludes in step 114 that the oracle, D, did decrypt the input ciphertext correctly, the method 100 proceeds to step 116 and increments the counter by one (i.e., cnt$\leftarrow$cnt+1). Alternatively, if the method 100 concludes in step 114 that the oracle, D, did not decrypt the input ciphertext correctly, the method 100 leaves the counter as is.

Once it has been determined whether or not the oracle, D, correctly decrypted the input ciphertext, the method 100 proceeds to step 118, where the method 100 determines whether steps 108-116 have been repeated a predefined number, W, of times. In one embodiment, W$\leftarrow$8$\lambda$(N/$\in$)$^2$. If the method 100 concludes in step 118 that steps 108-116 have not been repeated W times, the method 100 returns to step 108 and proceeds as described above to repeat steps 108-116 at least once more.

Alternatively, if the method 100 concludes in step 118 that steps 108-116 have been repeated W times, the method 100 proceeds to step 120 and defines $\hat{p}_i \in [0,1]$ as the fraction of times that the oracle, D, decrypted the input ciphtertexts, C, correctly. That is, $\hat{p}_i$ is the measured probability that the oracle, D, will decrypt correctly when given TrEncrypt$_{LBE}$ (TK, i,M). In one embodiment, the probability, $\hat{p}_i$, is estimated as cnt/W (i.e., the number of times that the oracle, D, decrypts correctly divided by the total number of attempted decryptions for a particular message).

In step 121, the method determines whether any users $i \in \{(1, \ldots, N+1\}$ remain to be analyzed (i.e., whether steps 105-120 have been performed for all users). If the method 100 concludes in step 121 that at least one user $i \in \{1, \ldots, N+1\}$ remains, the method 100 returns to step 105 and selects a next user $i \in \{1, \ldots, N+1\}$ for analysis.

Alternatively, if the method 100 concludes in step 121 that no users $i \in \{1, \ldots, N+1\}$ remain to be analyzed, the method 100 proceeds to step 122 and defines the set, S, of all users $i \in \{1, \ldots, N\}$ for which $|\hat{p}_i - \hat{p}_{i+1}|$ is greater than or equal to a predefined threshold (e.g., $|\hat{p}_i - \hat{p}_{i+1}| \geq \in/(4N)$). If $|\hat{p}_i - \hat{p}|_{i+1} \geq \in/(4N)$, it means one can be assured with relatively high confidence that user i is one of the traitors (colluding users). If $|\hat{p}_i - \hat{p}_{i+1}| < \in/(4N)$, one cannot be certain that user i is one of the traitors. The method 100 then proceeds to step 124 and outputs the set, S, as the group of guilty colluders (i.e., the group of "traitors" whose private keys $K_i$ were used by the pirate decoder) before terminating in step 126.

The method 100 thus encrypts a random message W times for each user $i \in \{1, \ldots, N+1\}$, and keeps count of how many times the oracle, D, correctly decrypts the encrypted message. The running time of the method 100 is cubic in the number, N, of users of a system. The running time can be made essentially quadratic in the number, N, of users and quadratic in the number, t, of traitors by using binary search rather than a linear scan.

The method 100 thereby provides a secure traitor tracing scheme. That is, the PLBE on which the traitor tracing method 100 is based is semantically secure against a chosen plaintext attack to an outsider who possesses no secret keys. Moreover, traceability against arbitrary collusion follows form the security of the PLBE scheme.

As will be discussed in further detail below, one embodiment of a traitor tracing system according to the present invention employs a bilinear group of composite order. It will be appreciated, however, that other techniques employing the general framework described herein do not necessarily require composite order groups. In one embodiment, G is an algorithm called a group generator that takes a security parameter, $\lambda \in Z > 0$, and outputs a tuple (p, q, G, $G_T$, e), where p and q are two distinct primes, G and $G_T$ are two cyclic groups of order n=pq, and e is a function e: $G^2 \rightarrow G_T$ that satisfies the following two properties:

(1) (bilinear) $\forall u, v \in G, \forall a, b \in Z, e(u^a, v^b) = e(u, v)^{ab}$; and (2) (non-degenerate) $\exists g \in G$ such that e(g, g) has order n in $G_T$.

It is assumed that the group action in G and $G_T$, as well as in the bilinear map, e, are all computable in polynomial time in λ. Furthermore, it is assumed that the description of G and $G_T$ includes a generator of G and $G_T$, respectively.

To summarize, G outputs the description of a group G of order n=pq, with an efficiently computable bilinear map. The notation $G_p$, $G_q$ will be used herein to denote the respective subgroups of order p and order q of G.

In one embodiment, a PLBE-based traitor tracing system can be constructed with sub-linear (e.g., $O(\sqrt{N})$) size ciphertexts. In systems using linear size ciphertexts, each user has a unique portion of the ciphertext assigned to him or her with which the message (or session key) to the user is encrypted. If an encryptor replaces the ciphertext component of a user, u, with a random encryption, only the user, u, can tell the difference; the ability of other users, associated with different portions of the ciphertext, to decrypt is unaffected.

When the ciphertexts are sub-linear in size, the approach must be different, because each user cannot have a portion of the ciphertext dedicated to him or her alone (i.e., intuitively, ciphertext components must be "shared" among users). In one embodiment, it is assumed that the number, N, of users in the system equals $m^2$ for some m. If the number, N, of real users, is not a square number, "dummy" users may be added to pad out to the next square. The users are then arranged in an m×m matrix. Each user is assigned and identified by a unique tuple (x,y), where $1 \leq x,y \leq m$.

For the construction of a PLBE traitor tracing system, a linear ordering of the users that can be traversed is needed. The first user in the system will be the user at matrix position (1,1), and from there the users are ordered by traversing one row at a time. More precisely, the user at matrix position (x,y) will have the index u=(x−1)m+y in the ordering. This can be considered "row-major" ordering. The PLBE scheme can now be referred to in terms of positions on the matrix.

An encryption to position (i,j) means that a user at position (x,y) will be able to decrypt the message if either: (a) x>i; or (b) both x=i and $y \geq j$. With this notation, the index hiding property, described above, states:

(1) For j<m, it is difficult to distinguish between an encryption of a message to (i, j) from (i, j+1) without the key of user (x=i, y=j); and (2) For j=m, it is difficult to distinguish an encryption of a message to position (i, j=m) from an encryption of a message to position (i+1, j=1) without the key of user (i, j=m), where the use of pairwise notation for referring to users and encryptions is a notational convenience.

As discussed above, in one embodiment, the construction of ciphertexts in accordance with the present invention makes use of bilinear maps of composite order n, where n=pq, and p and q are primes. Herein, p and q will be used as subscripts to denote whether a group element is in the subgroup of order p or order q. A key algebraic fact underlying the present scheme is that if $g_p$ is any element from the order p subgroup (i.e., $G_p$) and $g_q$ is any element from the order q subgroup (i.e., $G_q$), then one has: $e(g_p, g_q)=1$.

When the $\text{TrEncrypt}_{LBE}$ algorithm described above encrypts to an index (i, j), the $\text{TrEncrypt}_{LBE}$ algorithm creates ciphertext components for every column and every row of the index. The private keys associated with a user (x, y) are structured so that in order to decrypt a message, the user (x, y) must pair the ciphertext components from row x of the index with the ciphertext components from column y of the index. Methods for creating these ciphertexts are described in further detail below.

Figure 2:
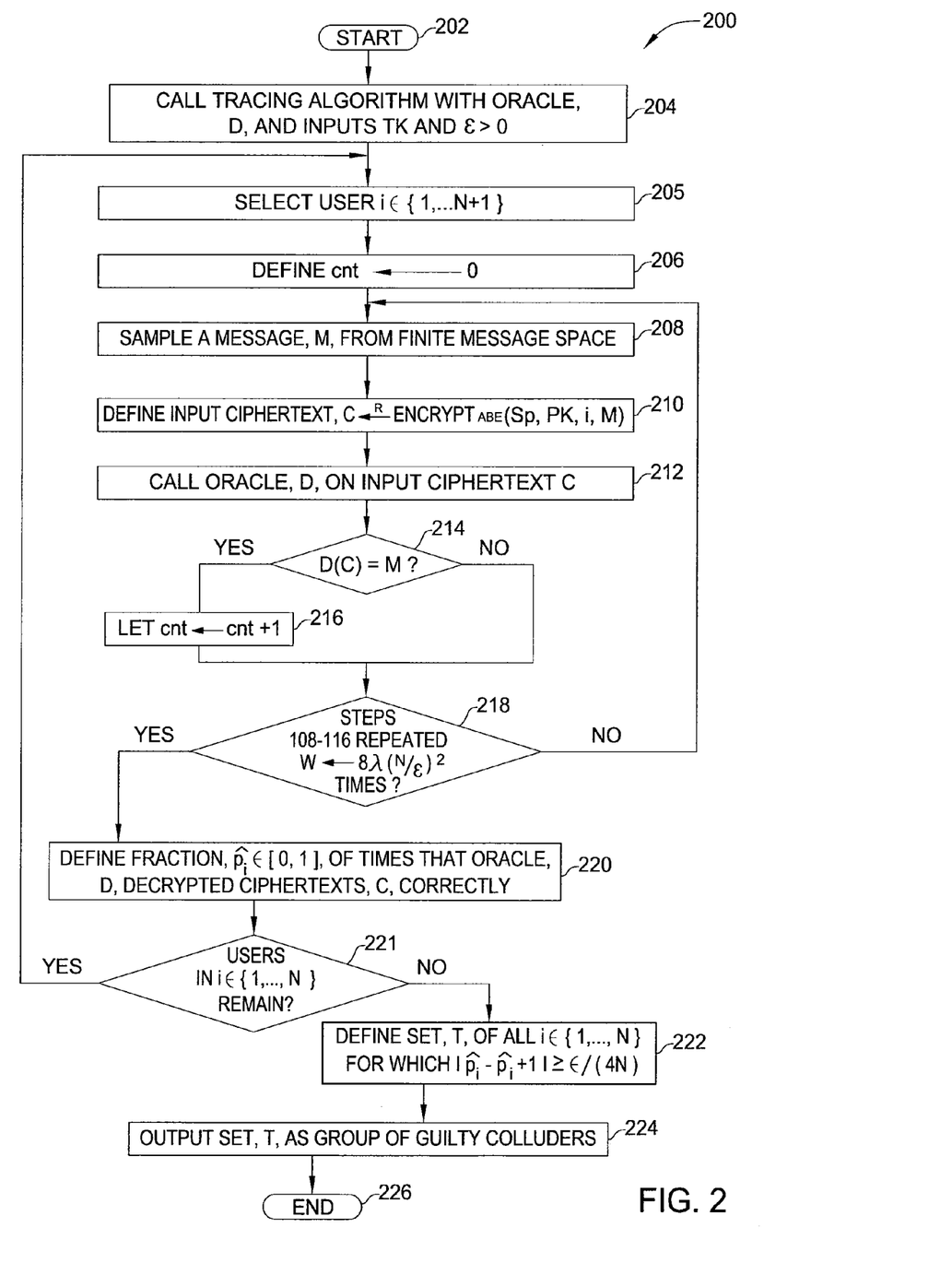
FIG. 2 is a flow diagram illustrating one embodiment of a method 200 for tracing and revoking, according to the present invention.

As discussed above, one embodiment of a ciphertext for use in PLBE-based traitor tracing systems includes both a "row" component and a "column" component. In one embodiment, ciphertexts for columns greater than or equal to j are "well formed" for both subgroups $G_p$ and $G_q$ (e.g., the ciphertexts are formed essentially as they would be in an encryption to normal (non-tracing) broadcast). However, for a column that is less than j, the method 200 will create a ciphertext that is well formed in the $G_q$ subgroup, but random in the $G_p$ subgroup.

In one embodiment, ciphertexts for rows less than i are completely random. Therefore, any user whose row index is less than x will not be able to decrypt a message. In one embodiment, the ciphertext components for row i are well formed in both the $G_q$ subgroup and the $G_p$ subgroup. A user with a row index i will be able to decrypt a message if the user's column index is greater than or equal to j. If the user's column index is less than j, the randomized ($G_p$) part of the column ciphertext will scramble the result of pairing the row and column ciphertext components together. In one embodiment, the ciphertext components for rows greater than i are well formed elements in the $G_q$ subgroup only. A user with a row index greater than i will be able to decrypt a message no matter what the user's column index is, because the pairing will "cancel out" the randomized ($G_p$) part of any ciphertext component with the row ciphertext component associated with the $G_q$ subgroup.

The decryption algorithm for a user (x, y) will attempt to decrypt a ciphertext in the same manner, no matter what the target index (i, j) is. The structure of the ciphertext will restrict decryption to only be successful for a user (x, y) if x>i or if x=i and $y \geq j$. Additionally, since the attempted decryption procedure is independent of (i, j), a user can only learn whether the user's decryption was successful or unsuccessful, and the system will be private.

To adapt the PLBE system discussed above to a traitor tracing system with sub-linear (e.g., $O(\sqrt{N})$) size ciphertexts, the four PLBE algorithms are re-written as follows:

The $\text{Setup}_{LBE}(N=m^2, 1^\kappa)$ algorithm takes the number of users, N (where $N=m^2$), and a security parameter, κ, as input. The $\text{Setup}_{LBE}(N=m^2, 1^\kappa)$ algorithm then generates an integer n=pq, where p and q are random primes whose sizes are determined by the security parameter, κ. The $\text{Setup}_{LBE}(N=m^2, 1^\kappa)$ algorithm creates a bilinear group, G, of composite order n. The $\text{Setup}_{LBE}(N=m^2, 1^\kappa)$ algorithm then creates random generators $g_p, h_p \in G_p$ and $g_q, h_q \in G_q$, and sets $g=g_p g_q$, $h=h_p h_q \in G$. Next, the $\text{Setup}_{LBE}(N=m^2, 1^\kappa)$ algorithm chooses random exponents $r_1, \ldots, r_m, c_1, \ldots, c_m, \alpha_1, \ldots, \alpha_m \in Z_n$ and $\beta \in Z_q$.

The public key, PK, output by the $\text{Setup}_{LBE}(N=m^2, 1^\kappa)$ algorithm thus includes the following description of the group and the following elements:

$$\begin{bmatrix} g, h, E = g_q^\beta, E_1 = g_q^{\beta r_1}, \ldots, E_m = g_q^{\beta r_m}, F_1 = h_q^{\beta r_1}, \ldots, F_m = h_q^{\beta r_m}, \\ G_1 = e(g_q, g_p)^{\beta \alpha_1}, \ldots, G_m = e(g_q, g_p)^{\beta \alpha_m}, H_1 = g^{c_1}, \ldots, H_m = g^{c_m} \end{bmatrix}$$

The private key, K, output by the $\text{Setup}_{LBE}(N=m^2, 1^\kappa)$ algorithm for user (x, y) is generated as $K_{x,y} = g^{\alpha_x} g^{r_x c_y}$. Finally, the authority's secret key, TK, includes factors p, q along with exponents used to generate the public key, PK.

The $\text{TrEncrypt}_{LBE}(K, M, (i,j))$ algorithm is the secret tracing key algorithm used by the tracing authority. The $\text{TrEncrypt}_{LBE}(K, M, (i,j))$ algorithm encrypts a message, M, to the subset of users for whom the row component of the ciphertext is greater than i, or for whom the row component of the ciphertext is equal to i and the column component of the ciphertext is greater than or equal to j.

The TrEncrypt$_{LBE}$(K, M, (i,j)) algorithm takes a user private key, K, the message, M ∈ G$_T$, and an index, (i,j), as input. The TrEncrypt$_{LBE}$(K, M, (i,j)) algorithm first chooses random $t \in Z_n$, $w_1, \ldots, w_m$, $s_1, \ldots, s_m \in Z_n$, $z_{p,1}, \ldots, z_{p,j-1} \in Z_p$ and $(v_{1,1}, v_{1,2}, v_{1,3}), \ldots, (v_{i-1,1}, v_{i-1,2}, v_{i-1,3}) \in Z_n$.

For each row x, four ciphertext components $(R_x, \tilde{R}_x, A_x, B_x)$ are created as follows:

If $x > i$: $R_x = g_q^{s_x r_x}$ $\tilde{R}_x = h_q^{s_x r_x}$ $A_x = g_q^{S_x t}$ $B_x = Me(g_q,g)^{\alpha_x s_x t}$ If $x = i$: $R_x = g^{s_x r_x}$ $\tilde{R}_x = h^{s_x r_x}$ $A_x = g^{S_x t}$ $B_x = Me(g,g)^{\alpha_x s_x t}$ If $x < i$: $R_x = g^{v_x \cdot 1}$ $\tilde{R}_x = h^{v_x \cdot 1}$ $A_x = g^{v_x \cdot 2}$ $B_x = e(g,g)^{v_x \cdot 3}$ For each column y, values $C_y$, $\tilde{C}_y$ are created as follows:

If $y \leq j$: $C_y = g^{c_y t} h^{w_y}$ $\tilde{C}_y = g^{w_y}$

If $y > j$: $C_y = g^{c_y t} g^{z_p y} h^{w_y}$ $\tilde{C}_y = g^{w_y}$

The ciphertext thus contains $5\sqrt{N}$ elements in G and $\sqrt{N}$ elements in G$_T$.

In the above description, there are three classes of rows. A row $x > i$ will have all of the row's elements in the G$_q$ subgroup, while the "target" row, i, will have its components in the full group G. A row $x < i$ will essentially have its group elements randomly chosen. A column $y \geq j$ will be well formed, while a column $y < j$ will be well formed in the G$_q$ subgroup, but not in the G$_p$ subgroup.

The Encrypt$_{LBE}$(PK, M) algorithm is used by an encryptor (e.g., broadcaster) to encrypt a message, M, such that all of the users/recipients can receive the message, M. The Encrypt$_{LBE}$(PK, M) algorithm is used during normal (e.g., non-tracing) operation to distribute content to all of the users. In one embodiment, the Encrypt$_{LBE}$(PK, M) algorithm produces ciphertexts that are indistinguishable from the ciphertexts produced by the TrEncrypt$_{LBE}$(K, M, (i,j)) algorithm to the index (1, 1) for the same message, M. The Encrypt$_{LBE}$(PK, M) algorithm first chooses random $t \in Z_n$, $w_1, \ldots, w_m$, $s_1, \ldots, s_m \in Z_n$. For each row x, four ciphertext components $(R_x, \tilde{R}_x, A_x, B_x)$ are created as follows:

$R_x = E_x^{s_x}$ $\tilde{R}_x = F_x^{s_x}$ $A_x = E^{S_x t}$ $B_x = MG_x^{s_x t}$ For each column y, values $C_y$, $\tilde{C}_y$ are created as follows:

$C_y = H_y^{t} h^{w_y}$ $\tilde{C}_y = g^{w_y}$

A user (x, y) uses the Decrypt$_{LBE}$((x, y), $K_{x,y}$, C) algorithm to decrypt a message, M, by computing:

$B_x \cdot (e(K_{x,y}, A_x) e(\tilde{R}_x, \tilde{C}_y) / e(R_x, C_y))^{-1}$

If the ciphertext was created from the tracing algorithm TrEncrypt$_{LBE}$, with parameters (l, j), then the result is the message, M, if $x > i$ or if $x = i$ and $y \geq j$. Moreover, if the ciphertext was created as Encrypt$_{LBE}$(PK, M), then all parties can decrypt and receive the message, M.

As discussed above, the size of the ciphertext is approximately $5\sqrt{N}$ elements in G and approximately $\sqrt{N}$ elements in G$_T$. In practice, a message, M, will be encrypted with a symmetric key cipher under a key, K, and the traitor tracing system of the present invention will be used to transmit the key, K, to each user. In further embodiments, ciphertext size can be saved by converting the encryption system to a key encapsulation mechanism (KEM). To do so, $B_x$ values are not included in the ciphertext, but user (x, y) instead extracts a key $K_x = e(K_{x,y}, A_x) e(\tilde{R}_x, \tilde{C}_y) / e(R_x, C_y)$. The extraction mechanism will actually derive $\sqrt{N}$ different keys $K_1, \ldots, K_m$, so that key $K_x$ is used to encrypt K for all users in row x. In some embodiments, this is more space efficient than including $\sqrt{N}$ group elements of G$_T$.

The Encrypt$_{LBE}$ algorithm requires $6\sqrt{N}$ exponentiations. The Decrypt$_{LBE}$ algorithm is relatively efficient and simple, requiring only three pairing computations. Thus, decryption time is independent of the number of users in the system.

A broadcast encryption system constructed in accordance with the present invention renders decryptors substantially oblivious as to which set of users the broadcast is targeted. A group of colluding users may be able to learn some information about the target set of users just by testing which colluding user(s) is able to decrypt. However, the group of colluding users will not be able to learn substantially more than what can naturally be inferred. The decryption algorithm performs the same steps to attempt decryption, no matter what the broadcast set is, thereby enabling the broadcast set to remain private.

Embodiments of the present invention may be further applied to a variety of other situations. For example, as described in further detail below, although the traitor tracing system is described as using a tracing key, TK, that is secret (e.g., such that only the authority is able to trace pirate decoders), in further embodiments, the tracing key, TK, may be public. Such a public tracing key would be especially useful in instances where a large content distribution system employs several agents (each of whom will need a tracing key) to perform tracing. In such a case, it is desirable to ensure that the system remains secure, even if one of the agents and his tracing key are compromised.

In the described $\sqrt{N}$ PLBE system, the tracing algorithm is public if a user is able to encrypt a message to an arbitrary set of indices (l, j). Then, the user could simply run the tracing algorithm in the same way that the authority would. In order to enable this, the user would be granted the capability to form $C_y$ column ciphertext components that are well formed in its $G_q$ subgroup, but not well formed in the $G_p$ subgroup. If an element of $G_p$ is included in the public key, the scheme will become insecure, as an attacker could use the public key to determine for which row index i a broadcast is intended.

The use of a public tracing key may further enable trace and revoke systems, in which, once a traitor is identified, future broadcasts are sent to the group of users excluding the identified traitor. In one embodiment, a system for tracing and revoking according to the present invention is substantially similar to the PLBE system described above.

In particular, one embodiment of a trace and revoke system is based on a primitive, referred to herein as augmented broadcast encryption (ABE), that uses several of the same algorithms as the PLBE system described above (i.e., Setup$_{ABE}$, Encrypt$_{ABE}$, and Decrypt$_{ABE}$). One difference, however, is that the Encrypt$_{ABE}$(S, PK, i, M) algorithm takes additional inputs. As before, PK is a public broadcasting key and M is a message. S is a subset of users $\{1, \ldots, N\}$, and i is an additional special input $1 \leq i \leq N+1$.

The algorithms used for an ABE-based trace and revoke system are as follows. The Setup$_{ABE}$(N, λ) is substantially similar to above, and takes the number, N, of users in a system and a security parameter, λ, as input. In one embodiment, the Setup algorithm runs in polynomial time in the security parameter, λ, and outputs a public broadcasting key, PK, and N private keys, $SK_1, \ldots, SK_N$, where the private key $SK_u$ is given to the user u.

The Encrypt$_{ABE}$(S, PK, i, M) algorithm, as described above, takes the public broadcasting key, PK, a message, M, a subset S is a subset of users $\{1, \ldots, N\}$, and an additional special input i ($1 \leq i \leq N+1$) and outputs a ciphertext, C, that can be decrypted by any user in $S \cap \{i, \ldots, N\}$. In one embodiment, the output of Encrypt$_{ABE}$(S, PK, N+1, M) contains no information about the message, M, and, for $i \in S$, the distribution generated by $\text{Encrypt}_{ABE}(S, PK, i, M)$ is indistinguishable from the distribution generated by $\text{Encrypt}_{ABE}(S, PK, i+1, M)$ to any attacker who does not possess the private key of user i. When $i \notin S$, the two distributions are indistinguishable to anyone.

The $\text{Decrypt}_{ABE}(S, j, SK_j, C, PK)$ algorithm takes a subset, $S \subseteq \{1, \ldots, N\}$, the the private key, $SK_j$, for user j, the ciphertext, C, and the public broadcasting key, PK, as input. The $\text{Decrypt}_{ABE}(S, j, SK_j, C, PK)$ algorithm outputs a message M or $\bot$.

The ABE system satisfies the following correctness property: for all subsets $S \subseteq \{1, \ldots, N\}$, all $i, j \in \{1, \ldots, N+1\}$ (where $j \leq N$), and for all messages, M:

Let $(PK, (SK_1, \ldots, SK_N)) \underset{R}{\leftarrow} \text{Setup}_{ABE}(N, \lambda)$ and let $C \underset{R}{\leftarrow} \text{Encrypt}_{ABE}(S, PK, i, M)$.

If $j \in S$ and $j \geq i$, then $\text{Decrypt}_{ABE}(S, j, SK_j, C, PK) = M$.

FIG. 2 is a flow diagram illustrating one embodiment of a method 200 for tracing and revoking, according to the present invention. The method 200 is derived from the ABE system described above and views a pirate decoder, D, as a probabilistic circuit that takes as input a ciphertext, C, and outputs some message M or $\bot$. The method 200 defines a secure ABE system, $\in = (\text{Setup}_{ABE}, \text{Encrypt}_{ABE}, \text{Decrypt}_{ABE})$. The method 200 assumes that a Setup algorithm in accordance with the ABE system described above (i.e., $\text{Setup}_{ABE}$) has been run and has output a public encryption key, PK, and N private keys, $K_1, \ldots, K_N$, for N users. In addition, the method 200 assumes that Encrypt and Decrypt algorithms in accordance with the ABE system described above (i.e., $\text{Encrypt}_{ABE}$ and $\text{Decrypt}_{ABE}$) have been run. The following steps of the method 200 thus define a $\text{Trace}^D(S_D, PK, \in)$ algorithm.

The method 200 is initialized at step 202 and proceeds to step 204, where the method 200 calls the tracing algorithm with oracle, D, and inputs comprising: a set, $S_D$, of users, the public broadcasting key, PK, and the parameter $\in > 0$.

In step 205, the method 200 selects a user i, where $i \in \{1, \ldots N+1\}$.

In step 206, the method 200 defines a counter that is initialized to zero (i.e., $cnt \leftarrow 0$).

In step 208, the method 200 samples a message, M, from a finite message space. In one embodiment, the message is sampled at random from the message space. In another embodiment, the method 200 samples a message that is "similar" to a message of interest (e.g., in the case of a video broadcast, the message 200 might look for an image that resembles an image of interest).

In step 210, the method 200 defines an input ciphertext as $C \underset{R}{\leftarrow} \text{Encrypt}_{ABE}(S_D, PK, i, M)$.

In step 212, the method 200 calls the oracle, D, on the input ciphertext, C. The method 200 then proceeds to step 214 and determines whether the oracle, D, decrypted the input ciphertext correctly (i.e., whether $D(C)=M$).

If the method 200 concludes in step 214 that the oracle, D, did decrypt the input ciphertext correctly, the method 200 proceeds to step 216 and increments the counter by one (i.e., $cnt \leftarrow cnt+1$). Alternatively, if the method 200 concludes in step 214 that the oracle, D, did not decrypt the input ciphertext correctly, the method 200 leaves the counter as is.

Once it has been determined whether or not the oracle, D, correctly decrypted the input ciphertext, the method 200 proceeds to step 218, where the method 200 determines whether steps 208-216 have been repeated a predefined number, W, of times. In one embodiment, $W \leftarrow 8\lambda(N/\in)^2$. If the method 200 concludes in step 218 that steps 208-216 have not been repeated W times, the method 200 returns to step 208 and proceeds as described above to repeat steps 208-216 at least once more.

Alternatively, if the method 200 concludes in step 218 that steps 208-216 have been repeated W times, the method 200 proceeds to step 220 and defines $\hat{p}_i \in [0,1]$ as the fraction of times that the oracle, D, decrypted the input ciphertexts, C, correctly. That is, $\hat{p}_i$ is the measured probability that the oracle, D, will decrypt correctly when given $\text{Encrypt}_{ABE}(S_D, PK, i, M)$. In one embodiment, the probability, $\hat{p}_i$, is estimated as cnt/W (i.e., the number of times that the oracle, D, decrypts correctly divided by the total number of attempted decryptions for a particular message).

In step 221, the method determines whether any users $i \in \{1, \ldots, N+1\}$ remain to be analyzed (i.e., whether steps 205-220 have been performed for all users). If the method 200 concludes in step 221 that at least one user $i \in \{1, \ldots, N+1\}$ remains, the method 200 returns to step 205 and selects a next user $i \in \{1, \ldots, N+1\}$ for analysis.

Alternatively, if the method 200 concludes in step 221 that no users $i \in \{1, \ldots, N+1\}$ remain to be analyzed, the method 200 proceeds to step 222 and defines the set, T, of all users $i \in \{1, \ldots, N\}$ for which $|\hat{p}_i - \hat{p}_{i+1}|$ is greater than or equal to a predefined threshold (e.g., $|\hat{p}_i - \hat{p}_{i+1}| \geq \in/(4N)$). If $|\hat{p}_i - \hat{p}_{i+1}| \geq \in/(4N)$, it means one can be assured with relatively high confidence that user i is one of the traitors (colluding users). If $|\hat{p}_i - \hat{p}_{i+1}| < \in/(4N)$, one cannot be certain that user i is one of the traitors. The method 200 then proceeds to step 224 and outputs the set, T, as the group of guilty colluders (i.e., the group of "traitors" whose private keys $K_i$ were used by the pirate decoder) before terminating in step 226.

Similar to the method 100 described above, the running time of the method 200 is cubic in the number, N, of users of a system. The running time can be made essentially quadratic in the number, N, of users by using binary search rather than a linear scan.

In one embodiment, a linear ordering of the users that can be traversed is used to construct an ABE-based trace and revoke system (e.g., similar to the PLBE-based traitor tracing system described above,). The same index notation and assumptions about the number of users is made.

The $\text{Setup}_{ABE}(N=m^2, \lambda)$ algorithm takes the number of users, N (where $N=m^2$), and a security parameter, $\lambda$, as input. The $\text{Setup}_{ABE}(N=m^2, \lambda)$ algorithm then generates an integer $n=pq$, where p and q are random primes whose sizes are determined by the security parameter, $\lambda$. The $\text{Setup}_{ABE}(N=m^2, \lambda)$ algorithm creates a bilinear group, G, of composite order n. The $\text{Setup}_{ABE}(N=m^2, \lambda)$ algorithm then creates random generators $g_p, h_p \in G_p$ and $g_q, h_q \in G_q$ and sets $g=g_p g_q$, $h=h_p h_q \in G$. Next, the $\text{Setup}_{ABE}(N=m^2, \lambda)$ algorithm chooses random exponents $\delta, r_1, \ldots, r_m, c_1, \ldots, c_m, \alpha_1, \ldots, \alpha_m \in Z_n$ and $\beta \in Z_q$ and $\gamma \in Z_p$.

The public key, PK, output by the $\text{Setup}_{ABE}(N=m^2, \lambda)$ algorithm thus includes the following description of the group and the following elements:

$$\begin{bmatrix} g, h, V = g^{\delta}g_p^{\gamma}, \tilde{V} = h^{\delta} \\ E_q = g_q^{\beta}, E_1 = g^{\beta r_1}, \ldots, E_m = g^{r_m}, E_{q,1} = g_q^{\beta r_1}, \ldots, E_{q,m} = g_q^{\beta r_m} \\ F_1 = h^{r_1}, \ldots, F_m = h^{r_m}, F_{q,1} = h_q^{\beta r_1}, \ldots, F_{q,m} = h_q^{\beta r_m} \\ G_1 = e(g, g)^{\alpha_1}, \ldots, G_m = e(g, g)^{\alpha_m}, G_{q,1} = \\ e(g_q, g_q)^{\beta\alpha_1}, \ldots, G_{q,m} = e(g_q, g_q)^{\beta\alpha_m} \\ H_1 = g^{c_1}, \ldots, H_m = g^{c_m} \\ U_1 = u_1, \ldots, U_m = u_m, U_{q,1} = u_{q,1}^{\beta}, \ldots, U_{q,m} = u_{q,m}^{\beta} \end{bmatrix}$$

The authority creates the private key, SK, for user (x, y) by first choosing a random exponent $\sigma_{x,y} \in Z_n$, and then generates the private key, SK, as:

$$SK_{x,y} = (d'_{x,y}, d''_{x,y}, d_1, \ldots, d_{y+1}, \ldots, d_m) = (g^{\alpha_x}g^{r_xc_y} \cdot u_{y,x}^{\sigma_{x,y}}, u_1^{\sigma_{x,y}}, \ldots, u_{y-1}^{\sigma_{x,y}}, u_{y+1}^{\sigma_{x,y}}, u_m^{\sigma_{x,y}})$$

The public parameters $u_{q,1}{}^{\beta}, \ldots, u_{q,m}{}^{\beta}$ are related to the broadcast portion of the trace and revoke system, while the other parameters are related to the traitor tracing portion of the system. The private key component $d'_{x,y}$ contains the private key gar blinded by $g^{\alpha_x}$ blinded by $g^{r_xC_y}$, which is related to the traitor tracing, and $u_{y}^{\sigma_{x,y}}$, which is related to the broadcast encryption system. Since $d'_{x,y}$ contains both pieces multiplied together, an attacker will be unable to separate these pieces out and decrypt the tracing and broadcast portions of the trace and revoke system separately. Thus, in one embodiment, for a key to be useful for decrypting a ciphertext, the key must be both in the broadcast set of the ciphertext and have an index greater than or equal to the encrypted index.

The Encrypt$_{ABE}$(S, PK, (i,j), M) algorithm is primarily used for tracing. The Encrypt$_{ABE}$(S, PK, (i,j), M) algorithm encrypts a message, M, to the subset of users who are in the group S and for whom the row component of the ciphertext is greater than i, or for whom the row component of the ciphertext is equal to i and the column component of the ciphertext is greater than or equal to j.

The Encrypt$_{ABE}$(S, PK, (i,j), M) algorithm encrypts messages $M \in G_T$. The Encrypt$_{ABE}$(S, PK, (i,j), M) algorithm first chooses random:

$$t, w_1, \ldots, w_m, s_1, \ldots, s_m \in Z_n$$

$$b_1, \ldots, b_{j-1} \in Z_n$$

$$(v_{1,1}, v_{1,2}, v_{1,3}), \ldots (v_{i-1,1}, v_{i-1,2}, v_{i-1,3}) \in Z_n$$

$S_x$ then denotes the set of all values y such that the user (x, y) is in the set S. For each row x, five ciphertext components $(R_x, \tilde{R}_x, T_x, A_x, B_x)$ are created as follows:

If $x > i$: $R_x = E_{q,x}^{s_x} \tilde{R}_x = F_{q,x}^{s_x} A_x = E_q^{s_xt} T_x = (\pi_{k \in s_x} U_{q,k})^{s_xt}$
$B_x = MG_{q,x}^{s_xt}$ If $x = i$: $R_x = E_x^{s_x} \tilde{R}_x = F_x^{s_x} A_x = g^{s_xt} T_x = (\pi_{k \in s_x} U_k)^{s_t}$
$B_x = MG_x^{s_xt}$ If $x < i$: $R_x = g^{v_{x,1}} \tilde{R}_x = h^{v_{x,1}} A_x = g^{v_{x,2}} T_x = (\pi_{k \in s_x} U_{q,k})^{v_{x,2}}$
$B_x = e(g,g)^{v_{x,3}}$ For each column y, values $C_y$, $\tilde{C}_y$ are created as follows:

If $y \geq j$: $C_y = H_y^t h^{w_y} \tilde{C}_y = g^{w_y}$

If $y < j$: $C_y = H_y^t h^{w_y} V^{b_y} \tilde{C}_y = g^{w_y} \tilde{V}^{b_y}$

For $y < j$, the $G_p$ subgroup will be completely random in $C_y$.

The final ciphertext, containing $O(\sqrt{N}=m)$ group elements comprises:

$$((R_x, \tilde{R}_x, T_x, A_x, B_x)_{x=1}^m (C_y, \tilde{C}_y)_{y=1}^m)$$

The $T_x$ values can be viewed as broadcast encryption to all members of row x who are in the sub-target set $S_x$. The parameters allow for public encryption (which in turn allows public traceability) to an arbitrary index (i, j). The public parameters that are from the $G_q$ subgroup are used for the encryption to rows greater than i. The public parameter values V, $\tilde{V}$ are used to create column components that are well formed in the $G_q$ subgroup and random in the $G_p$ subgroup.

A user $(x, y) \in S$ uses the Decrypt$_{ABE}$(S,(x, y), SK$_{x,y}$, C, PK) algorithm to decrypt a message, M, by first computing a temporary key:

$$K'_{x,y} = d'_{x,y} \prod_{\substack{k \in S_x \\ k \notin y}} d_{x,y,k}$$

The user then computes:

$$B_x/(e(K'_{x,y}, A_x)e(\tilde{R}_x, \tilde{C}_y)/(e(R_x, C_y)e(T_x, d''_{x,y})))^{-1}$$

If the ciphertext is encrypted to index (i, j) and x > i, then, in decryption, pairing $e(K'_{x,y}, A_x)$ gives the value $e(g,g_q)^{\alpha_xs_xt}$ $e(g, \pi_{k \in S_x} u_{q,k})^{s_xt\sigma_{x,y}} e(g,g_q)^{s_xtr_xC_y}$. The other pairings are used to divide out $e(g, \pi_{k \in S_x} u_{q,k})^{s_xt\sigma_{x,y}} e(g,g_q)^{s_xtr_xC_y}$ and get the blinding factor $e(g,g_q)^{\alpha_xs_xt}$. If x=i and y≧j, then decryption can be explained in a similar way, except that the target groups are $G_T$ instead of the subgroup $G_{T,q}$.

Although the inventive traitor tracing algorithms are described within the context of a stateless model (i.e., the tracer resets the tracing algorithm after each query), further embodiments of the invention contemplate a model wherein a pirate decoder can retain state between broadcasts. This embodiment involves the use of a PLBE algorithm that is secure under chosen-plaintext queries to arbitrary indices. In one specific embodiment, two PLBE systems in which the users are given opposite indices are used (i.e., the user with index u in the first system has index N+1−u in the second system).

Figure 3:
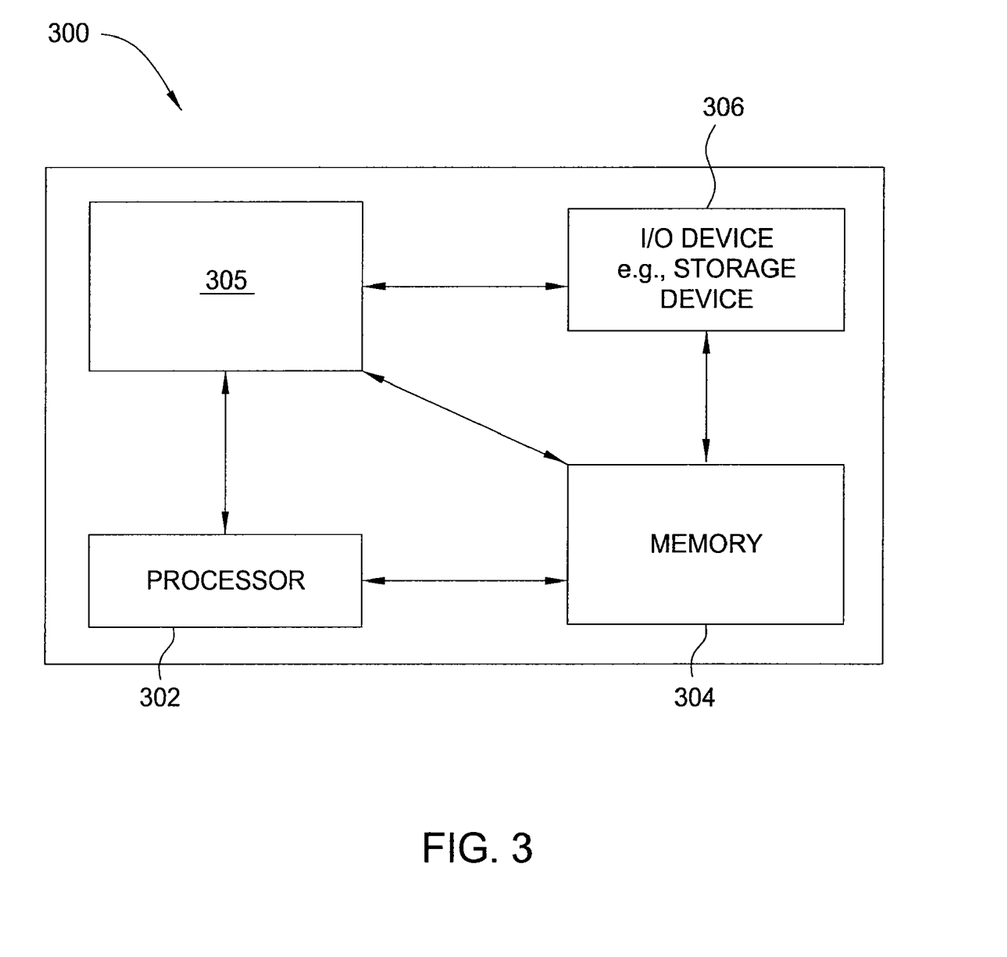
FIG. 3 is a high level block diagram of the present invention implemented using a general purpose computing device 300.

FIG. 3 is a high level block diagram of the present invention implemented using a general purpose computing device 300. It should be understood that the traitor tracing engine, manager or application (e.g., for tracing and/or revoking) can be implemented as a physical device or subsystem that is coupled to a processor through a communication channel. Therefore, in one embodiment, a general purpose computing device 300 comprises a processor 302, a memory 304, a tracing module 305 and various input/output (I/O) devices 306 such as a display, a keyboard, a mouse, a modem, and the like. In one embodiment, at least one I/O device is a storage device (e.g., a disk drive, an optical disk drive, a floppy disk drive).

Alternatively, the tracing engine, manager or application (e.g., tracing module 305) can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the tracing module 305 for tracing and/or revoking pirated encryption keys described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Although various embodiments which incorporate the teachings of the present invention have been shown and described in detail herein, those skilled in the art can readily devise many other varied embodiments that still incorporate these teachings.

What is claimed is:

1. A method for determining at least one traced private key used by a decoder to decrypt an encrypted message, the method comprising:
    defining an input ciphertext, the input ciphertext being associated with a tracing private key and having a sublinear size;
    calling the decoder on the input ciphertext; and
    associating the tracing private key with a set of traced private keys if the decoder is able to correctly decrypt the encrypted message in accordance with the input ciphertext, the set of traced private keys comprising at least one private key,
    wherein the sublinear size of the input ciphertext is a square root of a first number, the first number representing a number of users to whom the encrypted message is broadcast,
    wherein the tracing private key is structured such that, in order to decrypt the encrypted message, a first ciphertext component at a first position in an index of ciphertext components must be paired with a second ciphertext component at a second position in the index of ciphertext components, and
    wherein the first position in the index of ciphertext components and the second position in the index of ciphertext components are defined by a tuple associated with a user of the tracing private key.

2. The method of claim 1, further comprising:
    revoking at least one private key in accordance with the set of traced private keys.

3. The method of claim 2, wherein the revoking comprises:
    encrypting future messages such that the future messages are decrypted by a new set of users, the new set of users excluding at least a user associated with the revoked at least one private key.

4. The method of claim 1, wherein the decoder is treated as a black box oracle.

5. The method of claim 1, wherein the encrypted message is sampled from a finite message space at random.

6. The method of claim 1, further comprising:
    iterating the defining, the calling, and the associating a predefined number of times.

7. The method of claim 1, wherein the tracing private key is a secret tracing key.

8. The method of claim 1, wherein the associating is performed in accordance with a public tracing algorithm.

9. The method of claim 1, wherein the number of users is padded with at least one dummy user so that the first number is a square number.

10. A computer readable storage medium containing an executable program for determining at least one traced private key used by a decoder to decrypt an encrypted message, where the program performs a method comprising:
    defining an input ciphertext, the input ciphertext being associated with a tracing private key and having a sublinear size;
    calling the decoder on the input ciphertext; and
    associating the tracing private key with a set of traced private keys if the decoder is able to correctly decrypt the encrypted message in accordance with the input ciphertext, the set of traced private keys comprising at least one private key,
    wherein the sublinear size of the input ciphertext is a square root of a first number, the first number representing a number of users to whom the encrypted message is broadcast,
    wherein the tracing private key is structured such that, in order to decrypt the encrypted message, a first ciphertext component at a first position in an index of ciphertext components must be paired with a second ciphertext component at a second position in the index of ciphertext components, and
    wherein the first position in the index of ciphertext components and the second position in the index of ciphertext components are defined by a tuple associated with a user of the tracing private key.

11. The computer readable storage medium of claim 10, further comprising:
    revoking at least one private key in accordance with the set of traced private keys.

12. The computer readable storage medium of claim 11, wherein the revoking comprises:
    broadcasting future messages to a new set of users, the new set of users excluding at least a user associated with the revoked at least one private key.

13. The computer readable storage medium of claim 10, wherein the decoder is treated as a black box oracle.

14. The computer readable storage medium of claim 10, wherein the encrypted message is sampled from a finite message space at random.

15. The computer readable storage medium of claim 10, further comprising:
    iterating the defining, the calling, and the associating a predefined number of times.

16. The computer readable storage medium of claim 10, wherein the tracing private key is a secret tracing key.

17. The computer readable storage medium of claim 10, wherein the associating is performed in accordance with a public tracing algorithm.

18. The computer readable storage medium of claim 10, wherein the number of users is padded with at least one dummy user so that the first number is a square number.

19. Apparatus for determining at least one traced private key used by a decoder to decrypt an encrypted message, the apparatus comprising:
    a processor,
    a memory in communication with the processor,
    means for defining an input ciphertext, the input ciphertext being associated with a tracing private key and having a sublinear size;
    means for calling the decoder on the input ciphertext; and
    means for associating the tracing private key with a set of traced private keys if the decoder is able to correctly decrypt the encrypted message in accordance with the input ciphertext, the set of traced private keys comprising at least one private key,
    wherein the sublinear size of the input ciphertext is a square root of a first number, the first number representing a number of users to whom the encrypted message is broadcast, wherein the tracing private key is structured such that, in order to decrypt the encrypted message, a first ciphertext component at a first position in an index of ciphertext components must be paired with a second ciphertext component at a second position in the index of ciphertext components, and wherein the first position in the index of ciphertext components and the second position in the index of ciphertext components are defined by a tuple associated with a user of the tracing private key.

* * * * *